(12) United States Patent
Ozaki

(10) Patent No.: US 7,239,897 B2
(45) Date of Patent: Jul. 3, 2007

(54) OPENING/CLOSING TYPE PORTABLE INFORMATION TERMINAL

(75) Inventor: Kazuya Ozaki, Tokyo (JP)

(73) Assignee: NEC Corporation, Tokyo (JP)

(*) Notice: Subject to any disclaimer, the term of this patent is extended or adjusted under 35 U.S.C. 154(b) by 513 days.

(21) Appl. No.: 09/988,319

(22) Filed: Nov. 19, 2001

(65) Prior Publication Data

US 2002/0061770 A1    May 23, 2002

(30) Foreign Application Priority Data

Nov. 20, 2000   (JP)   ............................. 2000-353030

(51) Int. Cl.
    *H04B 1/38*       (2006.01)
(52) U.S. Cl. ............................. 455/575.1; 455/575.3; 455/575.4; 455/575.8
(58) Field of Classification Search ............ 455/575.1, 455/575.3, 575.4, 575.8, 550.1
    See application file for complete search history.

(56) References Cited

U.S. PATENT DOCUMENTS

| | | | |
|---|---|---|---|
| 5,485,517 A * | 1/1996 | Gray ..................... | 379/433.13 |
| 5,638,257 A | 6/1997 | Kumar et al. | |
| 5,751,544 A | 5/1998 | Song | |
| 5,973,915 A | 10/1999 | Evans | |
| 6,009,336 A | 12/1999 | Harris et al. | |
| 6,144,358 A * | 11/2000 | Narayanaswamy et al. . | 345/102 |
| 6,549,789 B1 * | 4/2003 | Kfoury ..................... | 455/550.1 |
| 6,628,974 B1 * | 9/2003 | Lim ......................... | 455/575.3 |
| 6,731,959 B1 * | 5/2004 | Kumagai et al. ........ | 455/575.3 |
| 6,748,243 B1 * | 6/2004 | Kubo et al. .............. | 455/569.1 |
| 6,850,773 B1 * | 2/2005 | Ghassabian .............. | 379/433.1 |

FOREIGN PATENT DOCUMENTS

| | | |
|---|---|---|
| JP | 5-211547 | 8/1993 |
| JP | 5-242040 | 9/1993 |
| JP | 06-061916 | 3/1994 |
| JP | 07-038945 | 2/1995 |
| JP | 7-288860 | 10/1995 |
| JP | 11-30226 | 2/1999 |
| JP | 11-215218 | 8/1999 |
| JP | 11-284700 | 10/1999 |
| JP | 11-330716 | 11/1999 |
| JP | 2002-135380 | 5/2002 |

OTHER PUBLICATIONS

European Search Report dated Mar. 21, 2003.
Japanese Final Office Action dated Sep. 3, 2004, with English-language translation of portion thereof.

* cited by examiner

*Primary Examiner*—Matthew Anderson
*Assistant Examiner*—Tuan Pham
(74) *Attorney, Agent, or Firm*—McGinn IP Law Group, PLLC

(57) ABSTRACT

In an opening/closing type portable information terminal equipped with a display portion housing (1) having a display portion (3) and an operating portion housing (2) having an operating portion (5), under the state that the face of the operating portion (5) of the operating portion housing (2) and the face of the display portion (3) of the display portion housing (1) face in the same side, the end portion of the display portion housing (1) and the end portion of the operating portion housing (2) are linked to each other by a link member (7) so that the display portion housing (1) is rotatable to the operating portion housing (2) around the rotational axis (CX) of the link member (7).

9 Claims, 5 Drawing Sheets

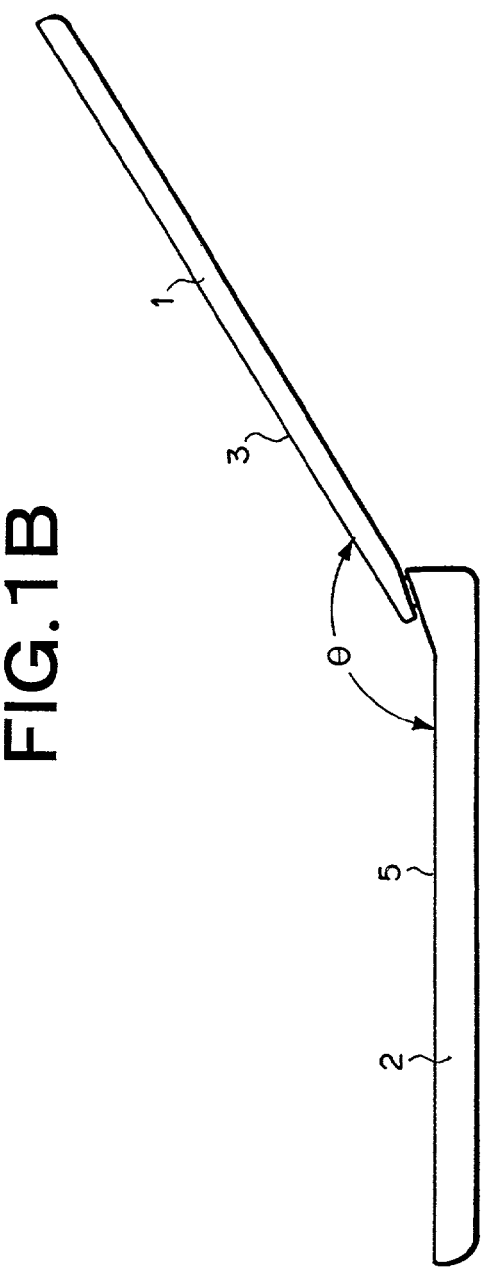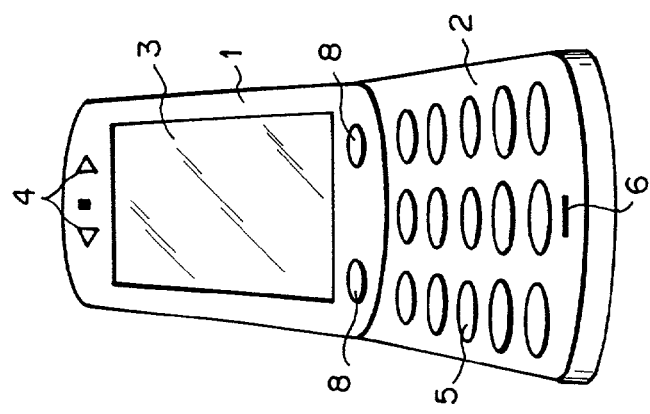

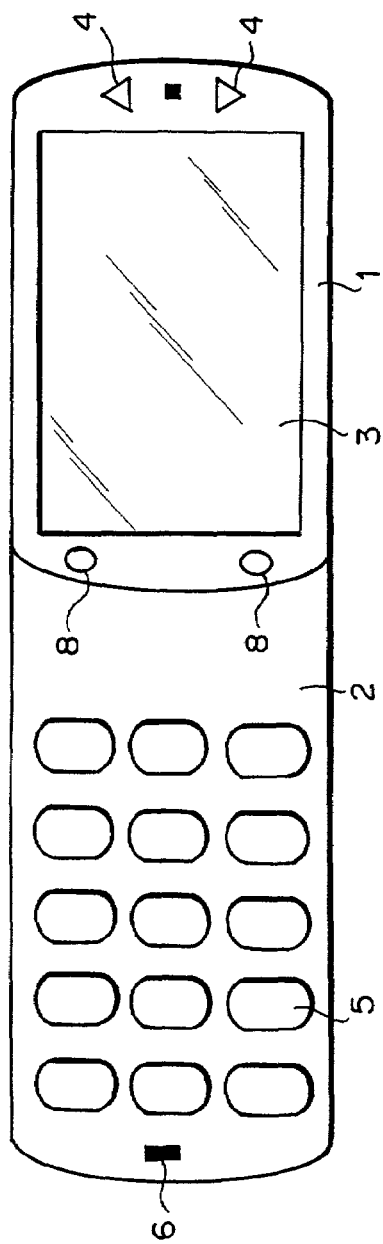
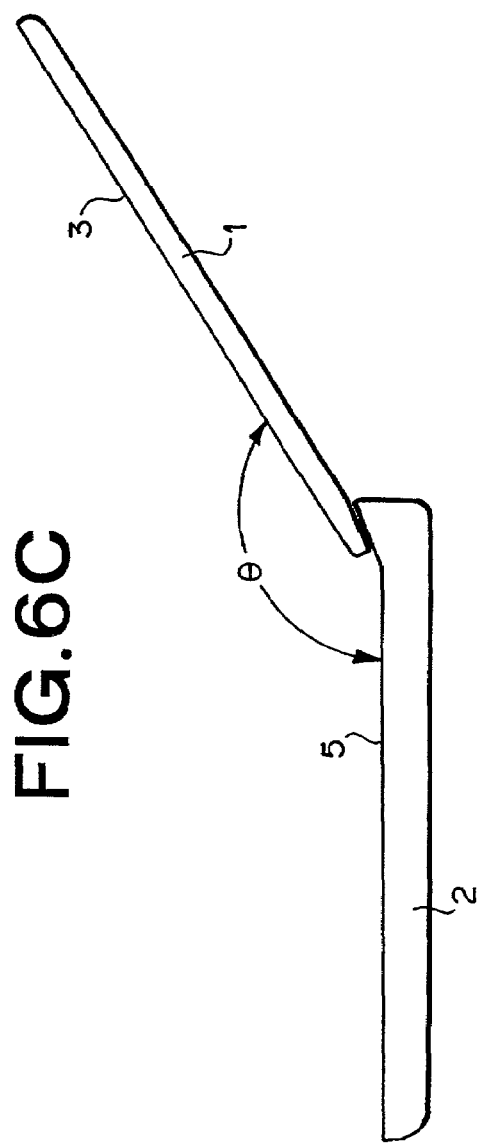
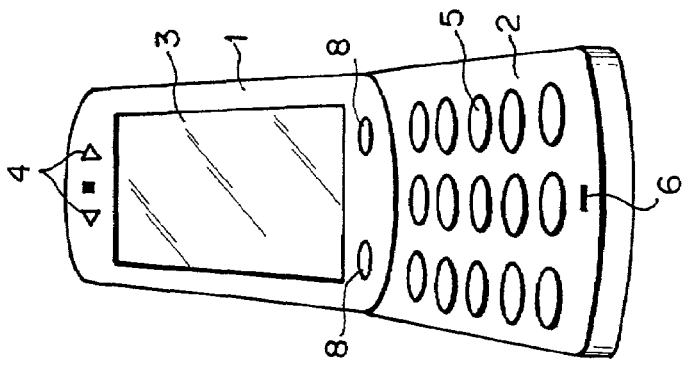
FIG. 6B
FIG. 6C
FIG. 6A

OPENING/CLOSING TYPE PORTABLE INFORMATION TERMINAL

BACKGROUND OF THE INVENTION

1. Field of the Invention

The present invention relates to an opening/closing type portable information terminal having such a structure that a display portion housing having a display portion and an operating portion housing having an operating portion are separately provided so that the display portion housing and the operating portion housing are opened/closed.

2. Description of the Related Art

A using style for cellular phones has been recently varied from a using style as a telephone to a using style as a portable information terminal or personal digital assistants (PDA) for the Internet, electronic mails, schedule management, etc. The cellular phones are often designed to have such a structure that a display portion housing having a liquid crystal display portion for performing various kinds of displays and an operating portion housing having operating keys are freely opened/closed around a hinge portion so that they are foldable with the liquid crystal display portion disposed inside, whereby a liquid crystal display portion having a large screen can be mounted on the display portion housing and the cellular phones can be used as portable information terminals or personal digital assistants for the Internet, electronic mails, etc. JP(A)-11-284700 and JP(A)-11-330716 disclose such a foldable type of cellular phones.

In an opening/closing type cellular phone with a liquid crystal display portion having a large screen as described above, a user cannot see the liquid crystal display portion when the two housings are folded. Therefore, when an electronic mail is received or the like, the user must see the electronic mail under the state that the liquid crystal display portion housing and the operating portion housing are kept open. Accordingly, it is inconvenient for a user to open/close a cellular phone every time an electronic mail is received.

SUMMARY OF THE INVENTION

The present invention has been implemented in view of the foregoing problem of the prior art, and has an object to provide an opening/closing type portable information terminal or PDA which enables a user to see a display portion under the state that a display portion housing and an operating portion housing are closed, thereby enhancing its convenience for users.

In order to attain the above object, according to the present invention, an opening/closing type portable information terminal equipped with a display portion housing having a display portion and an operating portion housing having an operating portion is characterized in that an end portion of the display portion housing is linked or connected to an end portion of the operating portion housing by a rotating mechanism under the state that the face of the display portion of the display portion housing is maintained to orient in the same side as the face of the operating portion of the operating portion housing so that the display portion housing and the operating portion housing are rotatable to each other around the rotational axis of the rotating mechanism. The rotational axis extends in a direction intersecting the face of the operating portion and the face of the display portion.

According to the present invention, there is also provided an opening/closing type portable information terminal, comprising:

a display portion housing having a display portion;

an operating portion housing having an operating portion; and a rotating mechanism for rotating the display portion housing relative to the operating portion housing between a closed state in which the display portion housing is disposed so as to cover the operating portion and an open state in which the display portion housing is disposed so as not to cover the operating portion, wherein an end portion of the display portion housing and an end portion of the operating portion housing are rotatably connected to each other by the rotating mechanism in such a manner that a face of the display portion is oriented in the same side as a face of the operating portion at both the closed state and open state.

According to the present invention, by linking the end portion of the display portion housing and the end portion of the operating portion housing to each other through the rotating mechanism under the state that the face of the display portion of the display portion housing and the face of the operating portion of the operating portion housing are maintained to face in the same side at both the closed and open states, the user can see the display portion of the display portion housing even when the display portion housing and the operating portion housing are closed. Accordingly, for example when an electronic mail is received or they are used as an electronic pocketbook, the information terminal can be used without opening the display portion housing and the operating portion housing (i.e., under the state that they are closed), and a convenient portable information terminal can be implemented.

Further, the display portion of the display portion housing and the operating portion of the operating portion housing face in the same side even when the display portion housing and the operating portion housing are opened, so that the user can operate the operating portion while seeing the display portion like the conventional cellular phone. Therefore, the facility is not lost. Further, when the present invention is applied to an opening/closing type cellular phone, under the state that the display portion housing and the operating portion housing are opened, the ear and mouth of the user are near to the speaker and the microphone respectively because a predetermined angle is kept between the display portion and the operating portion, so that the device of the present invention is convenient as a cellular phone.

BRIEF DESCRIPTION OF THE DRAWINGS

FIGS. 1A and 1B are diagrams showing the construction of an embodiment of an opening/closing type portable information terminal according to the present invention;

FIGS. 6A, 6B and 6C are diagrams showing the open state of the portable information terminal according to the embodiment of FIGS. 1A and 1B.

DETAILED DESCRIPTION OF THE PREFERRED EMBODIMENTS

Figure 2A:
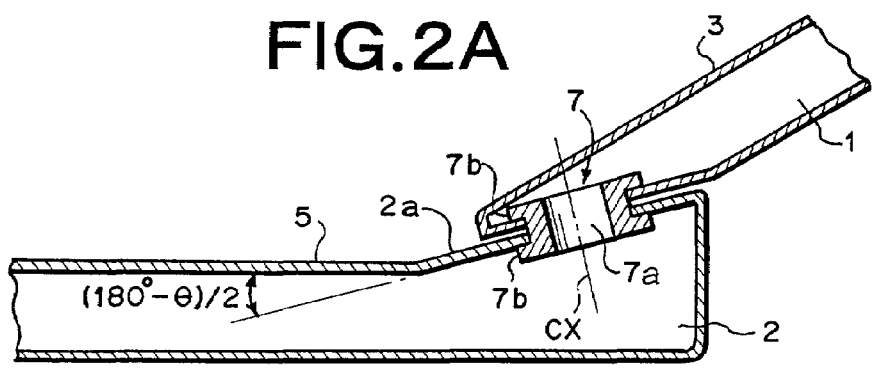
FIGS. 2A, 2B, 2C and 2D are enlarged views showing a link portion of the portable information terminal according to the embodiment shown in FIGS. 1A and 1B and its variation.

Preferred embodiments according to the present invention will be described hereunder with reference to the accompanying drawings.

FIGS. 1A and 1B are front and side views showing the construction of an embodiment of an opening/closing type portable information terminal or personal digital assistants (PDA) according to the present invention. The following embodiment will be described on the assumption that a cellular phone is representatively used as an opening/closing type portable information terminal. In the following embodiment, it is assumed that the cellular phone has not only functions as a telephone, but also has functions of a portable information terminal such as an electronic mail, an electronic pocketbook, etc., for example.

In FIGS. 1A and 1B, reference numeral 1 represents a display portion housing formed of synthetic resin or the like, and reference numeral 2 represents an operating portion housing formed of synthetic resin or the like. The display portion housing 1 is equipped with a liquid crystal display portion 3 having a large screen and a speaker 4 at the same side, and the operating portion housing 2 is equipped with an operating portion 5 comprising plural keys, and a microphone 6 at the same side. Further, the display portion housing 1 is also equipped with operating keys 8 at the same side as the display portion 3. An angle θ is kept between faces of the liquid crystal display portion 3 and the operating portion 5 as shown in FIG. 1B. The angle θ is within the range of 110 to 180 degrees, preferably 130 to 170 degrees, for example.

In the display portion housing 1 and the operating portion housing 2 are provided various circuits and various mechanisms that implement the functions as a cellular phone and the functions as a portable information terminal for electronic mails, etc. The descriptions of these circuits and mechanisms are omitted from the following description. Further, an antenna for receiving/transmitting electric waves is provided to the display portion housing 1, however, it is omitted from the drawings.

Figure 2B:
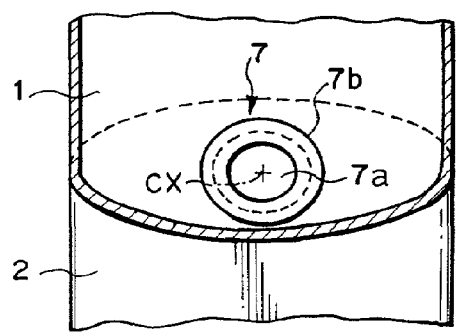

FIGS. 2A and 2B are enlarged cross-sectional views of a link portion between the display portion housing 1 and the operating portion housing 2. The link structure or connection structure of the display portion housing 1 and the operating portion housing 2 will be described with reference to FIGS. 2A and 2B, etc.

One end portion of the display portion housing 1 and one end portion of the operating portion housing 2 are linked or connected to each other by a link member 7 so that the display portion housing 1 is rotatable relative to the operating portion housing 2 around the link member 7, especially around the rotational axis CX.

Figure 2C:
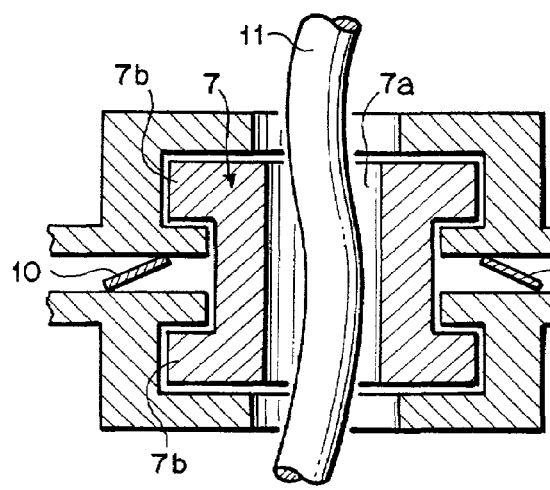

The link member 7 is provided as a rotating mechanism, and it is formed of synthetic resin or the like. The link member 7 is designed in the form of a cylinder having a cavity portion 7a therein passing there through along the rotational axis CX, and flange portions or guide portions 7b are formed at the upper and lower portions of the link member 7 so as to project radially outwardly. As shown in FIG. 2A, the link member 7 is embedded in each of the display portion housing 1 and the operating portion housing 2 half-and-half, that is, the upper and lower guide portions 7b are respectively embedded in the cavity portions of the display portion housing 1 and the operating portion housing 2 with being pressed against the inner wall surfaces of the housings. Such a structure is shown in FIG. 2C in detail.

The upper and lower guide portions 7b of the link member 7 are provided so that the display portion housing 1 and the operating portion housing 2 are prevented from being detached from the link member 7 to ensure the link of the housings and also the display portion housing 1 and the operating portion housing 2 can be smoothly rotated around the guide portion 7b of the link member 7 because the outer periphery of each guide portion 7b is circular. Since the link member 7 is embedded in the display portion housing 1 and the operating portion housing 2 while pressed against the housings 1 and 2, the display portion housing 1 and the operating portion housing 2 can be rotated to each other around the link member 7, especially around the rotational axis CX.

One of the guide portion 7b of the link member 7 may be fixed to any one of the display portion housing 1 and the operating portion housing 2. Further, as shown in FIG. 2C, a spring 10 may be provided around the outer peripheral portion of the link member 7 between the display portion housing 1 and the operating portion housing 2. That is, by pressing the display portion housing 1 and the operating portion housing 2 outwardly to each other under the spring force, the display portion housing 1 and the operating portion housing 2 can be prevented from coming into contact with each other or occurrence of backlash can be prevented when they are rotated around the link member 7, so that they can be smoothly rotated.

An inclined surface 2a which is inclined at an angle of $(180°-\theta)/2$ with respect to the surface of the operating portion 5 is formed in the operating portion housing 2 at the link portion as shown in FIG. 2A, and the link member 7 is disposed as to be inclined with respect to the face of the operating portion 5 and bottom surface of the operating portion housing 2 in accordance with the inclined surface 2a of the operating portion housing 2. The rotational axis CX is perpendicular to the inclined surface 2a. This structure keeps the angle θ between the operating portion housing 2 and the display portion housing 1, especially between the face of the display portion 3 and each of the face of the operating portion 5 and the back surface of the display portion housing 1, under the state that the display portion housing 1 and the operating portion housing 2 are opened as shown in FIG. 1B.

That is, as described above, the display portion housing 1 is provided with the speaker 4, and the operating portion housing 2 is provided with the microphone 6. Therefore, by keeping the angle θ appropriately between the display portion housing 1 and the operating portion housing 2, the ear of a user is near to the speaker 4 and the mouth of the user is near to the microphone 6 when the portable information terminal is used as a cellular phone. Accordingly, the portable information terminal of this embodiment achieves characteristics having the same level as a conventional folding type cellular phone in the sound quality of received call and transmitting call. As shown in FIG. 2C, the cavity portion 7a of the link member 7 is provided to pass a communication cable 11 therethrough, and the communication cable 11 is passed through the cavity portion 7a to electrically connect the circuits located in the display portion housing 1 and the circuits located in the operating portion housing 2.

Figure 3A:
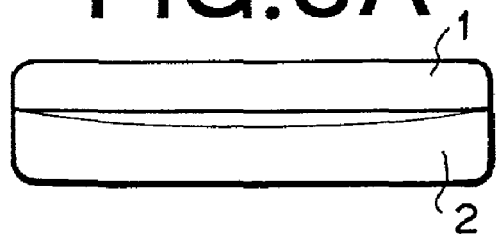
FIGS. 3A, 3B and 3C are diagrams showing the closed state of the portable information terminal of the embodiment shown in FIGS. 1A and 1B.
Figure 3B:
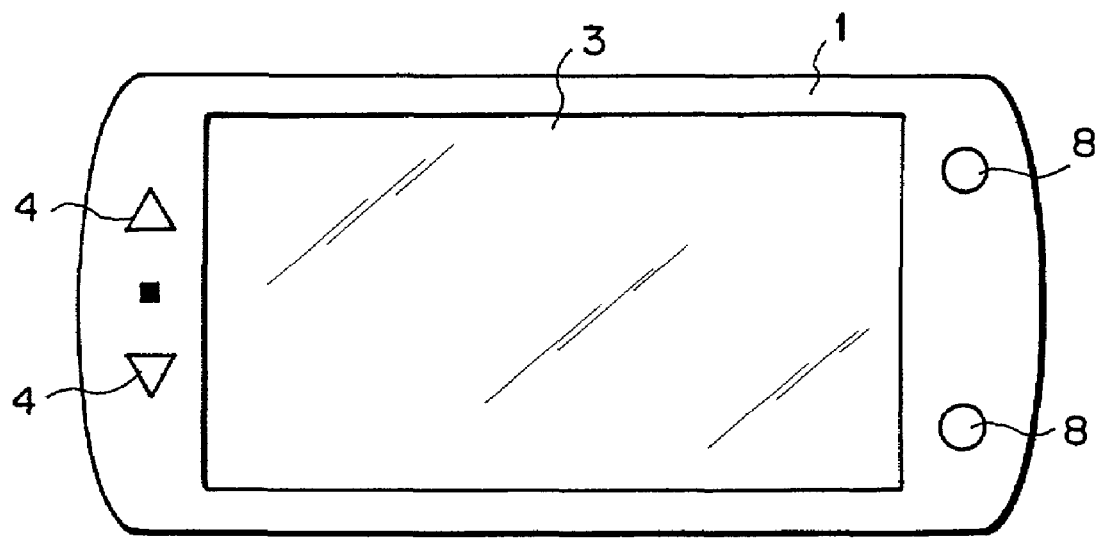
Figure 3C:
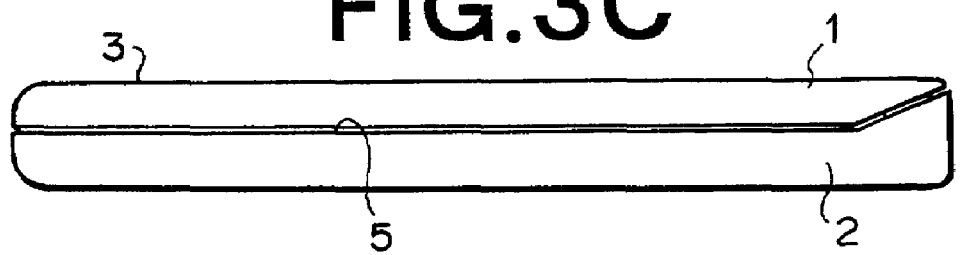

FIGS. 3A to 3C are front, plan and side views showing the state that the cellular phone of this embodiment is closed. Under the state that the display portion housing 1 and the operating portion housing 2 of the cellular phone are closed and the display portion housing 1 covers the operating portion 5, the liquid crystal display portion 3 faces outwardly, which is opposite to the conventional folding type cellular phone. Therefore, for example when an electronic mail is received, a user can see the mail displayed on the liquid crystal display portion 3 while the display portion housing 1 and the operating portion housing 2 are closed. Likewise, when the portable information terminal of this embodiment is used as an electronic pocketbook, it can be used while the display portion housing 1 and the operating portion housing 2 are closed.

Furthermore, since the display portion housing 1 is provided with the operating keys 8, the portable information terminal of this embodiment can be used while the display portion housing 1 and the operating portion housing 2 are kept closed. In this case, however, the area of the display portion housing 1 for mounting the operating keys 8 is limited, and thus only a small number of operating keys 8 can be mounted there. Therefore, there are provided only operating keys necessary to carry out simple operations such as seeing an electronic mail on the liquid crystal display portion 3 when the electronic mail is received, seeing a schedule of an electronic pocketbook, etc. under the state that the display portion housing 1 and the operating portion housing 2 are closed.

Figure 4:
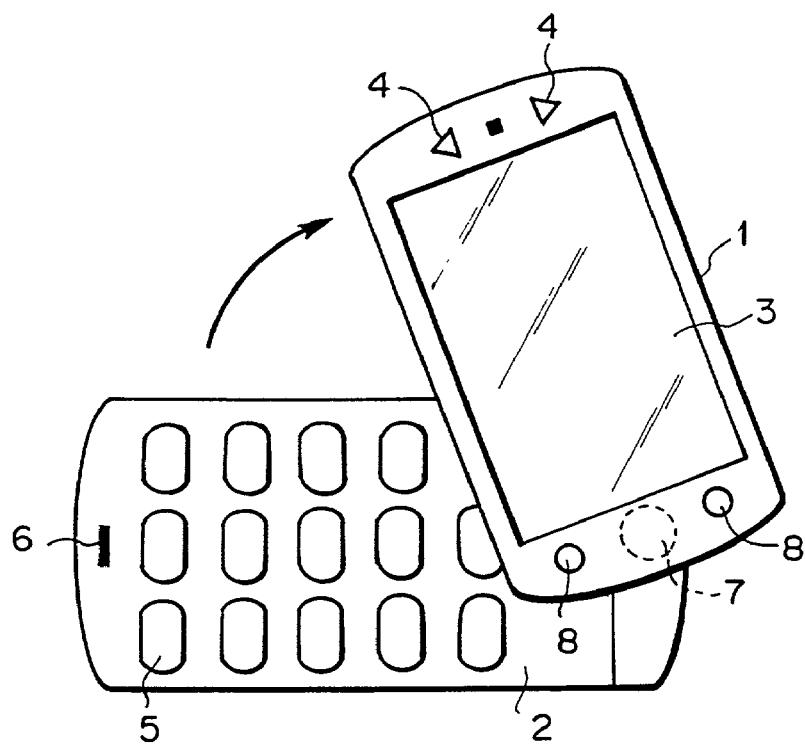
FIG. 4 is a diagram showing the opening operation of the portable information terminal of the embodiment of FIGS. 1A and 1B.
Figure 5:
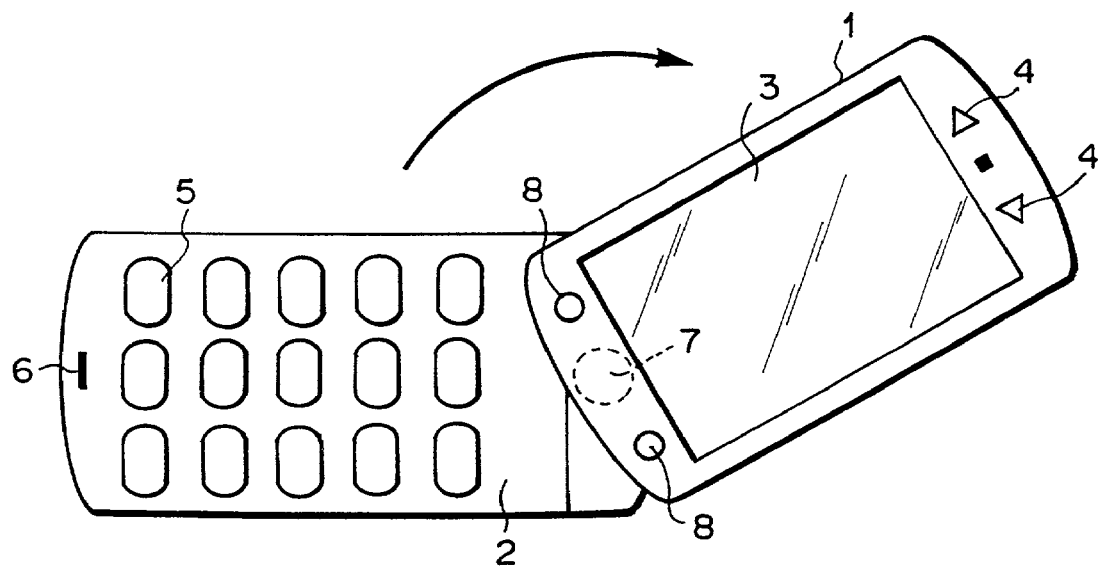
FIG. 5 is a diagram showing the opening operation of the portable information terminal of the embodiment of FIGS. 1A and 1B.

FIGS. 4 and 5 show the opening operation of the operating portion housing 2 and the display portion housing 1. The display portion housing 1 and the operating portion housing 2 are linked to each other by the link member 7. Therefore, when the display portion housing 1 is opened with respect to the operating portion housing 2 as shown in FIG. 4, the liquid crystal display portion housing 1 is rotated around the link member 7. When the display portion housing 1 is further opened, the display portion housing 1 is further rotated around the link member 7 as shown in FIG. 5 to keep the display portion housing 1 to be opened with respect to the operating portion housing 2 by 180 degrees.

FIGS. 6A to 6C are front, plan and side views showing the state that the display portion housing 1 and the operating portion housing 2 are opened. Under the state that the display portion housing 1 and the operating portion housing 2 are opened and the display portion housing 1 does not cover the operating portion 5, the ear and mouth of a user are near to the speaker 4 and the microphone 6 respectively because the angle θ is kept appropriately between the display portion 3 and the operating portion 5 as mentioned in the above, and this is very convenient for the user.

Furthermore, under the state that the display portion housing 1 and the operating portion housing 2 are opened, the liquid crystal display portion 3 of the display portion housing 1 and the operating portion 5 of the operating portion housing 2 face in the same side like the conventional folding type cellular phone, so that the user can manipulate the keys of the operating portion 5 and keys 8 while seeing the liquid crystal display portion 3, and this is convenient for the user. Still further, under this state, the cellular phone of this embodiment can be also used as a portable information terminal for electronic mails, an electronic pocketbook, etc. by operating the keys of the operating portion 5.

Figure 2D:
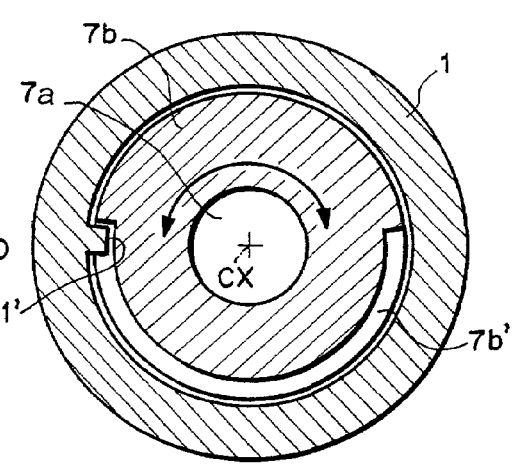

In case that the lower guide portion 7b of the link member 7 is fixed to the operating portion housing 2, the rotation of the display portion housing 1 around the link member 7 is preferably restricted within the range of 180 degrees, i.e. from the closed state of FIGS. 3A to 3C to the open state of FIGS. 6A to 6C. FIG. 2D shows an embodiment of means for performing such restriction of the rotation, in which a groove 7b' is formed on the outer periphery of the upper guide portion 7b so as to extend slightly greater than 180 degrees around the rotational axis CX, and a projection 1' is formed on the inner surface of the display portion housing 1 so as to be in engagement with the groove 7b'.

In the foregoing description, the present invention is applied to an opening/closing type cellular phone. However, the present invention is not limited to the cellular phone, and it may be applied to an opening/closing type portable information terminal or personal digital assistants (PDA) such as an electronic pocketbook, a compact computer or the like. Further, in the above-described embodiment, the cylindrical link member having a cavity therein is used as the rotating mechanism. However, the present invention is not limited to this rotating mechanism, and various rotating mechanism performing substantially the same rotation may be used.

What is claimed is:

1. A portable information terminal, comprising:
   a display portion housing comprising a display portion;
   an operating portion housing comprising an operating portion;
   a link member for connecting an end portion of said display portion housing to an end portion of said operation portion housing:
   a mechanism for rotating said display portion housing relative to said operating portion housing around a rotational axis of said link member; and
   a spring, disposed around the link member, which biases said display portion housing away from said operating portion housing in a direction parallel to said rotational axis,
   wherein said display portion housing and said operating portion housing are rotated relative to each other by said rotating mechanism between a closed state in which said display portion housing is disposed so as to cover said operating portion and an open state in which said display portion housing is disposed so as not to cover said operating portion, a face of said display portion is oriented in the same side as a face of said operating portion at both said closed state and open state, said link member is designed in a form of a cylinder having a guide portion projecting radially outwardly of at least one end thereof, and said display portion housing or operating portion housing is pressed against said guide portion by a biasing force of said spring.

2. The portable information terminal as claimed in claim 1, wherein said link member has a cavity portion through which passes a communication cable for electrically connecting circuits located in said display portion housing to circuits located in said operating portion housing.

3. The portable information terminal as claimed in claim 1, wherein said display portion housing is provided with operating keys on the same side as the display portion so that said operating keys are operable under said closed state.

4. The portable information terminal as claimed in claim 1, wherein said link member has the guide portion at the one end thereof and the other end of said link member is fixed to any one of said display portion housing and said operating portion housing.

5. The portable information terminal as claimed in claim 1, wherein said rotational axis maintains an acute angle with both the face of said operating portion and the face of said display portion.

6. The portable information terminal as claimed in claim 1, wherein said guide portion has a groove formed on an outer periphery thereof which extends slightly greater than 180 degrees around said rotational axis, and one of said display portion housing and operating portion housing has a projection which engages said groove so that the rotation between said display portion housing and operating portion housing is limited to approximately 180 degrees.

7. The portable information terminal as claimed in claim 1, wherein a predetermined angle is formed between the face of said operating portion and the face of said display portion under said open state.

8. The portable information terminal as claimed in claim 7, wherein the predetermined angle is within the range of about 110 to 180 degrees.

9. The portable information terminal as claimed in claim 8, wherein the predetermined angle is within the range of about 130 to about 170 degrees.

* * * * *